US007216852B2

(12) United States Patent
Gravelle

(10) Patent No.: US 7,216,852 B2
(45) Date of Patent: May 15, 2007

(54) MULTI-POSITION WIRE INSULATOR AND FENCE SUPPORT BRACKET

(76) Inventor: James A. Gravelle, 530 N. 6th St., Eureka, MT (US) 59917

( * ) Notice: Subject to any disclaimer, the term of this patent is extended or adjusted under 35 U.S.C. 154(b) by 0 days.

(21) Appl. No.: 10/033,516

(22) Filed: Dec. 24, 2001

(65) Prior Publication Data

US 2003/0116760 A1 Jun. 26, 2003

(51) Int. Cl.
*A01K 3/00* (2006.01)

(52) U.S. Cl. ............................ 256/10; 256/32; 256/47; 256/48; 256/50; 256/54; 256/DIG. 3

(58) Field of Classification Search .................... 256/1, 256/2, 3, 4, 10, 19, 21, 32, 34, 35, 36, 47, 256/48, 50, 54, 65.01, 65.02, 65.03, DIG. 3, 256/DIG. 5; 403/326, 329, 331, 363
See application file for complete search history.

(56) References Cited

U.S. PATENT DOCUMENTS 4,771,137 A * 9/1988 Thompson .............. 174/163 F

* cited by examiner

*Primary Examiner*—Daniel P. Stodola
*Assistant Examiner*—Michael P. Ferguson
(74) *Attorney, Agent, or Firm*—Gray, Plant, Mooty, Mooty & Bennett P.A.; Peter Forrest

(57) ABSTRACT

A support bracket is adapted to secure wire fence elements to posts having T-shaped cross-sections with a leg and two cross-arms. The bracket includes a first slot adapted and constructed to receive a cross-arm of a fence post, and a second slot adapted and constructed to receive a cross-arm of the fence post, the second slot being generally aligned with the first slot. A third slot is adapted and constructed to receive a leg of the fence post, and is generally perpendicular to the first and second slots. The bracket can be mounted to the post in a first position in which the leg is received in the third slot, and a second position in which the leg extends opposite the third slot.

18 Claims, 1 Drawing Sheet

MULTI-POSITION WIRE INSULATOR AND FENCE SUPPORT BRACKET

FIELD OF THE INVENTION

The present invention relates generally to wire fences. Specifically, the present invention relates to fence support brackets that serve as wire insulators for electric fences.

BACKGROUND OF THE INVENTION

The introduction and widespread adoption of the wire fence brought about enormous cultural and economic changes. The wire fence enabled relatively inexpensive and durable livestock containment systems that revolutionized the way ranches and farms operated. The subsequent development of metal fence posts and electrically conductive fences further enhanced the ability of ranchers and farmers to manage their stock.

Inherent in the construction of such fencing is the problem of mounting an electrically charged wire onto an electrically conductive metal post such that the post is insulated from the wire. Several patents address the problem, among which is U.S. Pat. No. 4,077,611 to Wilson. This patent is directed to a fence wire mount and insulator device adapted for mounting on a metal fence post of T-shaped cross section in which wire is supported in spaced relationship relative to the fence post by a bracket member which engages the fence post and is shaped to accommodate a variety of configurations and dimensions. The bracket which engages the fence post is provided with a curved offset portion which permits elongation of one portion of the bracket and permits initial easy insertion of the fence post relative to the bracket.

Another example can be seen in U.S. Pat. No. 6,209,853 to Roy et al., which shows an electric wire insulator and support bracket for metal fence posts having a cylindrical bracket arm slotted along its length to receive and be mounted on a flange of a steel fence post. Tie holes are located at each side of the slot for positioning a tie member for securing the bracket to the post. Wire retention slots are located in each end of the arm for supporting electric fence wires and retention pins confine the wires in the slots.

U.S. Pat. No. 5,412,158 to Yearwood shows an electric wire insulator for connection with a T-shaped corner fence post formed by a generally U-shaped rigid mounting member having parallel legs transversely spanning a T-shaped post. A pair of U-shaped bracket members each journalling a dielectric spool are provided with a threaded rod rigidly connected with the bight portion of the respective U-shaped bracket and threadedly entering the respective mounting member leg for impinging the mounting member on the T-shaped post. One of the U-shaped brackets may be angularly rotated about the axis of its threaded rod for disposing the axis of one dielectric spool normal to the axis of the other dielectric spool.

U.S. Pat. No. D248,750 to Langlie et al. deals with ornamental design for an electric fence extender for T-posts having an extension tab to assist in the mounting of the extender to a T-post.

While known mechanisms are reasonably effective in mounting fence wire to posts, they are accompanied by several drawbacks. For example, known brackets are typically unidirectional, i.e., they can be secured to only one side of the fence post. Furthermore, known brackets are difficult to remove from the post without destroying the bracket, a frequent occurrence when fences are removed or relocated.

It can thus be seen that the need exists for a simple, inexpensive, repositionable and easily removable fence support bracket that serves as a wire insulator for electric fences.

SUMMARY OF THE INVENTION

These and other objects are achieved by providing a support bracket for securing wire fence elements to posts having T-shaped cross-sections with a leg and two cross-arms. The bracket includes a first slot adapted and constructed to receive a cross-arm of a fence post, and a second slot adapted and constructed to receive a cross-arm of the fence post, the second slot being generally aligned with the first slot. A third slot is adapted and constructed to receive a leg of the fence post, and is generally perpendicular to the first and second slots. The bracket can be mounted to the post in a first position in which the leg is received in the third slot, and a second position in which the leg extends opposite the third slot.

In an embodiment, the support bracket includes a first tab connected to the first slot, and a second tab connected to the second slot. The first and second tabs are adapted and constructed to facilitate opening of the slots for insertion and removal of the cross-arms therefrom. The bracket can be fabricated from a relatively flexible electrically insulative material, for example, from a thermoplastic material such as polypropylene. At least one reinforcing rib can be provided adjacent to the third slot.

The features of the invention believed to be patentable are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE INVENTION

Figure 1:
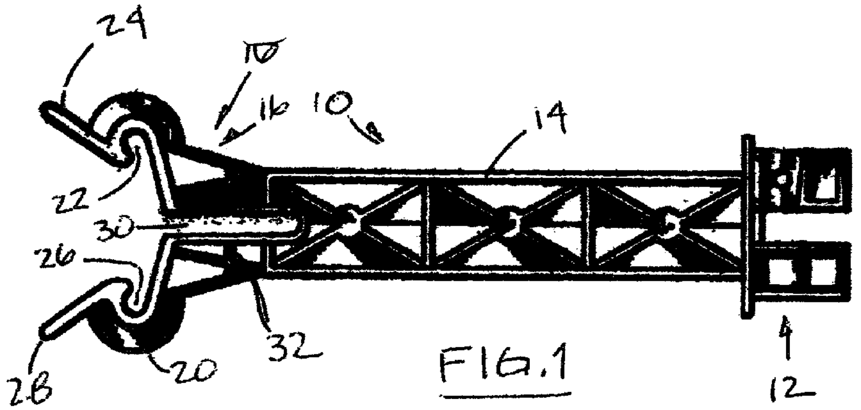
FIG. 1 is a schematic illustration of a support bracket in accordance with the principles discussed herein.

A support bracket 10 in accordance with the principles of the present invention is illustrated in FIG. 1. The bracket 10 includes a holder arrangement 12 adapted to retain a wire fence element, and a shaft 14 extending from the holder 12. A fence attachment portion 16 is connected to the shaft 14 opposite the holder 12.

The attachment portion 16 includes a first lateral retainer 18 and a second lateral retainer 20. The lateral retainer 18 includes a slot 22 adapted and constructed to receive a cross-arm of a fence post. A tab 24 extends from the lateral retainer 18. The lateral retainer 20 includes a slot 26 adapted and constructed to receive a cross-arm of a fence post. A tab 28 extends from the lateral retainer 20. The slots 22, 26 are generally aligned with one another. The tabs 24, 28 are adapted and constructed to facilitate opening of the slots 22, 26 for insertion and removal of the cross-arms therefrom. A third slot 30 is adapted and constructed to receive a leg of the fence post, and is generally perpendicular to the slots 22, 26. Reinforcing ribs 32 can be provided to add stiffness to the bracket 10.

Figure 2:
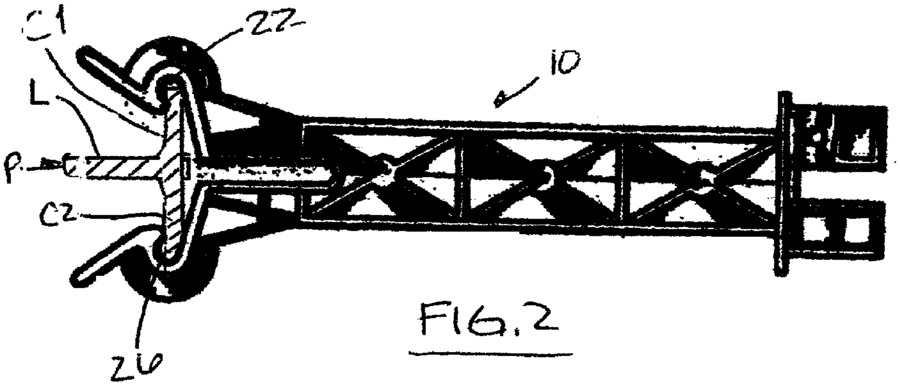
FIG. 2 is a schematic illustration of a the FIG. 1 support bracket mounted in a first position.

As shown in FIG. 2, the bracket 10 can be mounted to a fence post P in a first position in which a leg L of the post P is received in the third slot 30. In this position, a first cross-arm C1 is received in the slot 22, and a second cross-arm C2 is received in the slot 26. This mounts the bracket 10 on what is typically considered the "front" side of the post P.

Figure 3:
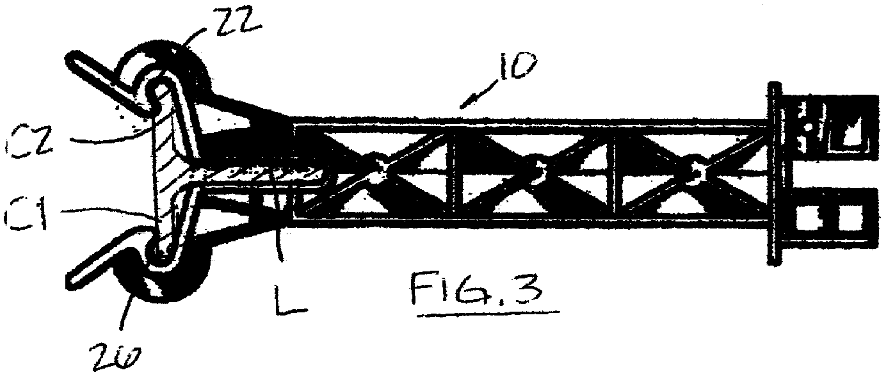
FIG. 3 is a schematic illustration of a the FIG. 1 support bracket mounted in a second position.

As shown in FIG. 3, the bracket 10 can alternatively be mounted to the fence post P in a second position in which the leg L of the post P is extends opposite the third slot 30. In this position, the first cross-arm C1 is received in the slot 26, and the second cross-arm C2 is received in the slot 22. This mounts 30 the bracket 10 on what is typically considered the "back" side of the post P.

Figure 4:
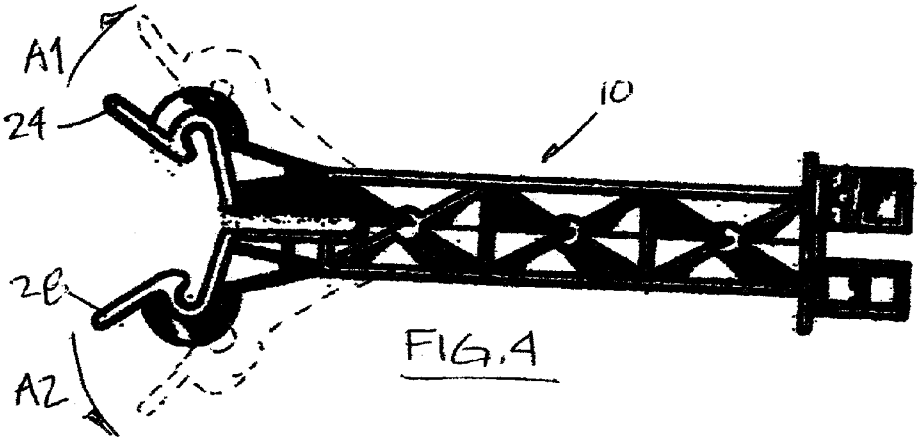
FIG. 4 is a schematic illustration of a the FIG. 1 support bracket showing the function of the mounting tabs.

FIG. 4 illustrates the functioning of the tabs 24, 28. During installation or removal of the bracket 10 from the post P, a user applies force, by hand, to the tabs 24, 28 in the direction of arrows A1, A2. This moves the lateral retainers outwardly to the position shown in broken line, thus opening the slots 22, 26 sufficiently to facilitate easy mounting or removal of the bracket 10 to or from the post P.

The bracket of the present invention permits installation on either the "front" or "back" side of a T-shaped fence post, thus affording greater flexibility of installation. Furthermore, situations in which posts are oriented opposite to one another can be easily accommodated without removing and reinstalling the post itself. The tabs further facilitate ease of operation of the bracket. The bracket can be fabricated from a relatively flexible electrically insulative material, for example, from a thermoplastic material such as polypropylene.

Although the present invention has been described with reference to specific embodiments, those of skill in the art will recognize that changes may be made thereto without departing from the scope and spirit of the invention as defined by the appended claims.

What is claimed is:

1. A support bracket for securing wire fence elements to posts having T-shaped cross-sections with a leg and two cross-arms, the bracket comprising the following:

a wire holder adapted to retain a wire fence element;

a first lateral retainer defining a first slot adapted and constructed to receive a cross-arm of a fence post, the first slot having a width, length, and configuration generally conforming to a width, length, and configuration of the cross-arm to be received therein;

a second lateral retainer defining a second slot adapted and constructed to receive a cross-arm of the fence post, the second slot having a width, length, and configuration generally conforming to a width, length, and configuration of the cross-arm to be received therein;

a third slot adapted and constructed to receive a leg of the fence post, the third slot being generally perpendicular to the first and second slots and having a width, length, and configuration generally conforming to a width, length, and configuration of the leg to be received therein;

first and second tabs extending from respective first and second lateral retainers, each adapted and constructed to facilitate outward movement of the first and second lateral retainers away from each other by force applied by a user to the first and second tabs, thus opening the slots for insertion and removal of the cross-arms therefrom;

whereby the bracket can be mounted to the post in a first position in which the leg is received in the third slot, and a second position in which the leg extends opposite the third slot.

2. A support bracket according to claim 1, wherein the bracket is fabricated from an electrically insulative material.

3. A support bracket according to claim 2, wherein the bracket is fabricated from a relatively flexible electrically insulative material.

4. A support bracket according to claim 3, wherein the bracket is fabricated from a thermoplastic material.

5. A support bracket according to claim 4, wherein the bracket is fabricated from polypropylene.

6. A support bracket according to claim 1, further comprising at least one reinforcing rib adjacent to the third slot.

7. A support bracket for securing wire fence elements to posts having T-shaped cross-sections with a leg and two cross-arms, the bracket comprising the following:

a wire holder adapted to retain a wire fence element;

a first lateral retainer defining a first slot adapted and constructed to receive a cross-arm of a fence post, the first slot having a width, length, and configuration generally conforming to a width, length, and configuration of the cross-arm to be received therein;

a second lateral retainer defining a second slot adapted and constructed to receive a cross-arm of the fence past, the second slot being generally aligned with the first slot and having a width, length, and configuration generally conforming to a width, length, and configuration of the cross-arm to be received therein;

a third slot adapted and constructed to receive a leg of the fence post, the third slot being generally perpendicular to the first and second slots and having a width, length, and configuration generally conforming to a width, length, and configuration of the leg to be received therein;

first and second tabs extending from respective first and second lateral retainers, each adapted and constructed to facilitate outward movement of the first and second lateral retainers away from each other by force applied by a user to the first and second tabs, thus opening the slots for insertion and removal of the cross-arms therefrom;

whereby the bracket can be mounted to the post in a first position in which the leg is received in the third slot, and a second position in which the leg extends opposite the third slot.

8. A support bracket according to claim 7, wherein the bracket is fabricated from an electrically insulative material.

9. A support bracket according to claim 8, wherein the bracket is fabricated from a relatively flexible electrically insulative material.

10. A support bracket according to claim 9, wherein the bracket is fabricated from a thermoplastic material.

11. A support bracket according to claim 10, wherein the bracket is fabricated from polypropylene.

12. A support bracket according to claim 7, further comprising at least one reinforcing rib adjacent to the third slot

13. A method for securing wire fence elements to fence posts having T-shaped cross-sections wit a leg and two cross-arms, the method comprising the following steps:

providing a first support bracket including a wire holder adapted to retain a wire fence element, a first lateral retainer defining a first slot adapted and constructed to receive a cross-arm of a fence post and a first tab extending from the first lateral retainer, a second lateral retainer defining a second slot adapted and constructed to receive a cross-arm of the fence post and a second tab extending from the second Lateral retainer, each of the slots having a width, length, and configuration generally conforming to a width, length, and configuration of the cross-arm to be received therein, and a third slot adapted and constructed to receive a leg of the fence post, the third slot being generally perpendicular to the first and second slots and having a width, length, and configuration generally conforming to a width, length, and configuration of the leg to be received therein;

providing a second support bracket including a wire holder adapted to retain a wire fence element,a first lateral retainer defining a first slot adapted and constructed to receive a cross-arm of a fence post and a first tab extending from the first lateral retainer, a second lateral retainer defining a second slot adapted and constructed to receive a cross-arm of the fence post and a second tab extending from the second lateral retainer, each of the slots having a width, length, and configuration generally conforming to a width, length, and configuration of the cross-arm to be received therein, and a third slot adapted and constructed to receive a leg of the fence post, the third slot being generally perpendicular to the first and second slots and having a width, length, and configuration generally conforming to a width length, and configuration of the leg to be received therein;

using the tabs of the first bracket for leverage to open the slots of the first bracket for insertion of the cross arms of a first fence post in a first position in which the leg of the first fence post is received in the third slot of the first bracket; and using the tabs of the second bracket for leverage to open the slots of the second bracket for insertion of cross arms of a second fence post in a second position in which the leg of the second post extends opposite the third slot of the second bracket.

14. A method according to claim 13, wherein the steps of providing a first and second bracket comprise fabricating the brackets from a relatively flexible electrically insulative material.

15. A method according to claim 14, wherein the steps of providing a first and second bracket comprise fabricating the brackets from a thermoplastic material.

16. A method according to claim 15, wherein the steps of providing a first and second bracket comprise fabricating the brackets from polypropylene.

17. A method according to claim 13, wherein the steps of providing a first and second bracket comprise providing at least one reinforcing rib adjacent to the third slot

18. A support bracket fix securing a wire fence element to a T-shaped fence post having a leg and two cross-arms, the bracket comprising:

a wire holder adapted to retain a wire fence element;

first and second lateral retainers defining respective first and second interior slots arranged at a slightly increasable oblique angle with respect to each other, each slot having interior dimensions only slightly exceeding exterior dimensions of a respective cross-arm of the fence post;

a third interior slot generally directed oppositely from a bisector of the oblique angle, and having interior dimensions only slightly exceeding exterior dimensions of the leg of the fence post;

first and second tabs connected to the respective first and second lateral retainers adjacent the respective first and second slots, each tab being externally directed at an angle and by an amount sufficient to enable a user to apply leverage by hand to increase the oblique angle and thereby enable insertion and removal of the cross-arms into their respective first and second slots;

in which the bracket is mountable to the post either with the leg received within the third slot, or with the leg extending opposite the third slot.

* * * * *